United States Patent
Hehn et al.

(10) Patent No.: US 11,636,840 B2
(45) Date of Patent: Apr. 25, 2023

(54) VEHICLE, APPARATUS, METHOD AND COMPUTER PROGRAM FOR SHARING SOUND DATA

(71) Applicant: VOLKSWAGEN AG, Wolfsburg (DE)

(72) Inventors: Thorsten Hehn, Ingolstadt (DE);
Joakim Cerwall, Stockholm (SE);
Ernst Zielinski, Bochum (DE); Roman Alieiev, Stendal (DE); Teodor Buburuzan, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/053,302

(22) PCT Filed: Apr. 12, 2019

(86) PCT No.: PCT/EP2019/059378
§ 371 (c)(1),
(2) Date: Nov. 5, 2020

(87) PCT Pub. No.: WO2019/214898
PCT Pub. Date: Nov. 14, 2019

(65) Prior Publication Data
US 2021/0168496 A1    Jun. 3, 2021

(30) Foreign Application Priority Data
May 9, 2018    (EP) ................................ 18171656

(51) Int. Cl.
*G10K 11/175*    (2006.01)
*H04B 1/3822*    (2015.01)
(Continued)

(52) U.S. Cl.
CPC .......... *G10K 11/175* (2013.01); *H04B 1/3822* (2013.01); *H04R 1/265* (2013.01); *H04R 3/04* (2013.01)

(58) Field of Classification Search
CPC ...... H03G 3/32; G08G 1/0112; G08G 1/0129; G08G 1/0965; G08G 1/096791;
(Continued)

(56) References Cited

U.S. PATENT DOCUMENTS 8,676,427 B1 * 3/2014 Ferguson .............. B60W 10/20
701/23
2006/0074645 A1   4/2006 Tischer
(Continued)

FOREIGN PATENT DOCUMENTS

CN    106899617 A    6/2017
CN    107919025 A    4/2018
(Continued)

*Primary Examiner* — Kile O Blair
(74) *Attorney, Agent, or Firm* — 2SPL Patent Attorneys PartG mbB; Kieran O'Leary

(57) ABSTRACT

Embodiments relate to a vehicle, an apparatus, a method and a computer program for sharing sound data. The apparatus (10) for sharing sound data from a vehicle (100) comprises one or more interfaces (12) configured to communicate in a mobile communication system (300) and one or more microphones (16) configured to record sound data. The apparatus (10) further comprises a control module (14), which is configured to control the one or more interfaces (12) and the one or more microphones (12). The control module (14) is further configured to record sound samples using the one or more microphones (16), and to communicate information on the sound samples to another vehicle (200) using the one or more interfaces (12).

17 Claims, 4 Drawing Sheets

(51) Int. Cl.
*H04R 1/26* (2006.01)
*H04R 3/04* (2006.01)

(58) Field of Classification Search
CPC .......... G08G 1/096888; H04R 2499/13; G01C 21/3461; G01C 21/3691; G01C 1/3694; G07C 5/008; G07C 5/06; G07C 5/0833
See application file for complete search history.

(56) References Cited

U.S. PATENT DOCUMENTS

| | | | |
|---|---|---|---|
| 2011/0111728 A1* | 5/2011 | Ferguson | H04M 1/72424 455/404.2 |
| 2016/0105775 A1 | 4/2016 | Azmat | |
| 2018/0137697 A1* | 5/2018 | Dudar | G07C 5/0808 |

FOREIGN PATENT DOCUMENTS

| | | | | |
|---|---|---|---|---|
| EP | 3192061 B1 * | 12/2019 | | G01H 3/10 |
| KR | 101676940 B1 | 11/2016 | | |
| KR | 20020079166 A | 10/2020 | | |

\* cited by examiner

VEHICLE, APPARATUS, METHOD AND COMPUTER PROGRAM FOR SHARING SOUND DATA

The present invention relates to a vehicle, an apparatus, a method and a computer program for sharing sound data, more particularly, but not exclusively to a concept for sharing recorded sound information between different vehicles to enable advanced sound detection and/or analysis.

There are many noise generation sources in traffic. Combustion engines of different sizes are utilized in different vehicle types and are contributors to traffic evoked noise. Other contributors are tire sounds as well as artificially generated sounds like sirens, horn honking, and others. Noise and sound in general have a huge negative as well as positive impact on our life and life quality. Noise analysis has been a subject of research. For example, document DE 10 2012 016 819 A1 describes a concept for sensing a noise environment around a driver of a vehicle, for determining a danger indicating noise, and for warning the driver in case such noise is determined. Document EP 3 244 400 A1 discloses active road noise control using reference vibrational sensors in a vehicle. Document DE 10 2014 225 859 A1 describes a method for sound recognition for sirens or horns in a traffic scenario. Document CN104483665 (A) provides a beam forming method and a beam forming system of a passive acoustic sensor array. Document CN104332050 (A) provides a concept for monitoring an equivalent traffic flow, vehicle speed, and other parameters of the road traffic. Environmental noise, road traffic noise, and a plurality of index values of the noise indexes can be measured through a general sound level meter or a statistic analyzing device.

There is a demand for an improved traffic noise sampling concept. The independent claims provide an improved concept for traffic noise sampling.

Embodiments are based on the finding that precise understanding and (instantaneous) geographical mapping of noise and sound (incl. sources) may be beneficial and may have a great potential. Embodiments may enable a sound analysis procedure, which may be based on distributed measurements done by several cars, vehicles or road users in general. Embodiments are further based on the finding that built-in microphones of multiple cars or vehicles can be used to measure a noise and sound situation around a vehicle. Such measured data can be shared (via wireless link), potentially supplemented by additional data (as position of the vehicle/microphones, microphone characteristics, number of microphones etc.) with other vehicles or a network.

Embodiments provide an apparatus for sharing sound data from a vehicle. The apparatus comprises one or more interfaces configured to communicate in a mobile communication system. The apparatus comprises one or more microphones configured to record sound data. The apparatus further comprises a control module, which is configured to control the one or more interfaces and the one or more microphones. The control module is further configured to record sound samples using the one or more microphones, and to communicate information on the sound samples to another vehicle using the one or more interfaces. Embodiments allow sharing of recorded sound data between vehicles.

In further embodiments the control module may be configured to process the sound samples to determine the information on the sound samples. Processed sound information may be shared among vehicles in embodiments, allowing more efficient identification of sound objects. The control module may be further configured to process the sound samples according to one or more elements of the group of low pass filtering, high pass filtering, band pass filtering, spectral analysis, correlation analysis, noise analysis, sound signature detection, noise map creation, and spatial analysis. Pre-processing may enable a more efficient distributed processing concept in embodiments. Furthermore, the control module may be configured to process the sound samples based on a characteristic of the one or more microphones. Embodiments may enable a reduction of individual microphone characteristics or distortion of the sound samples generated by microphone characteristics.

The control module may be configured to record the sound samples after reception of an according service request in some embodiments. Embodiments may enable a service for collecting and processing distributed sound data. The control module may be configured to communicate the information on the sound samples to a network server via the mobile communication system. Embodiments may make the sound data available to a network server, e.g. for further analysis or processing. The control module may be configured to receive information on other sound samples from another network entity. Embodiments may enable to collect sound samples from other vehicles for further processing or analysis. For example, positioning of sound sources may be eased when making externally recorded sound data available, e.g. locating a malfunctioning component on a vehicle.

In further embodiments the control module may be configured to combine locally recorded sound samples with the information on the other sound samples. Combined sound data may enable enhanced positioning of sound sources in the environment or on the vehicles. In embodiments the control module may be configured to generate a noise map of a predefined region, such that noise analysis can be further enabled based on the noise map. For example, the control module may be configured to determine information on an erroneous machine behavior based on the sound samples. The control module may be configured to identify or locate objects based on the sound samples. Object identification may be enabled using distributed sound processing in embodiments. A further embodiment is a vehicle comprising an embodiment of the apparatus as described herein. The control module may be configured to reduce a noise level inside the vehicle based on the sound samples. Embodiments may enable a noise reduction inside a vehicle. Embodiments also provide a system comprising two or more embodiments of vehicles, e.g. a mobile communication system.

Embodiments further provide a method for sharing sound data of a vehicle. The method comprises recording sound samples using one or more microphones, and communicating information on the sound samples to another vehicle. Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Some other features or aspects will be described using the following non-limiting embodiments of apparatuses or methods or computer programs or computer program products by way of example only, and with reference to the accompanying figures, in which.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
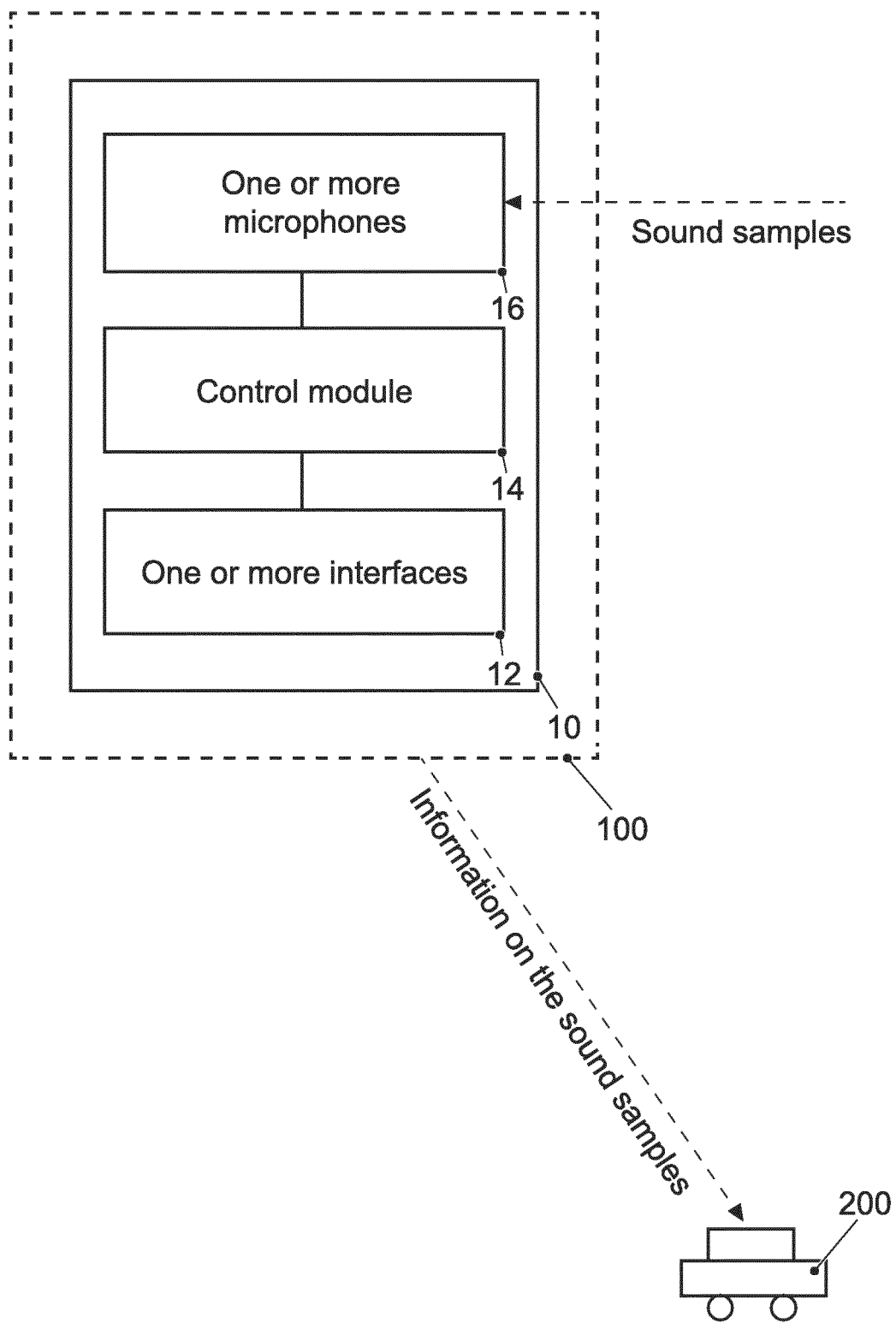
FIG. 1 illustrates an embodiment of an apparatus for sharing sound data, an embodiment of a vehicle and an embodiment of a system.

FIG. 1 illustrates an embodiment of an apparatus 10 for sharing sound data from a vehicle 100. The apparatus 10 comprises one or more interfaces 12, which are configured to communicate in a mobile communication system 300. The apparatus 10 comprises one or more microphones 16 configured to record sound data. The apparatus 10 further comprises a control module 14, which is configured to control the one or more interfaces 12 and the one or more microphones 16. As shown in FIG. 1 the control module 14 is coupled to the one or more interfaces 12 and to the one or more microphones 16. The control module 14 is further configured to record sound samples using the one or more microphones 16, and to communicate information on the sound samples to another vehicle 200 using the one or more interfaces 12. FIG. 1 further illustrates an embodiment of a vehicle 200 and an embodiment of a system 300.

In embodiments the one or more interfaces 12 may correspond to any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. The one or more interfaces 12 may comprise further components to enable according communication in the mobile communication system 300, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 12 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 12 may serve the purpose of transmitting or receiving or both, transmitting and receiving, information, such as information related to capabilities, application requirements, requests, message interface configurations, feedback, information related to control commands etc.

In embodiments the control module 14 may be implemented using one or more processing units, one or more processing devices, any means for processing, such as a processor, a computer or a programmable hardware component being operable with accordingly adapted software. In other words, the described functions of the control module 14 may as well be implemented in software, which is then executed on one or more programmable hardware components. Such hardware components may comprise a general purpose processor, a Digital Signal Processor (DSP), a micro-controller, etc.

The one or more microphones 16 may be any type of sound, audio or noise sensing component. For example, the one or more microphones may comprise any device, module, means or unit capable of converting an acoustic signal into an electric signal. Examples for microphones are a dynamic microphone, which may use a loop, coil or an inductor and a magnet. Another type of microphone is a condenser microphone using a diaphragm in a capacitor. Yet another example is a piezoelectric microphone with a crystal of piezoelectric material. The one or more microphones may comprise further components for processing of the acoustical or electrical signal. Examples of such components are one or more analog filters, one or more amplifiers, one or more pre-amplifiers, one or more analog-to-digital converters, one or more sample and hold components, one or more digital filters, etc.

In embodiments audio data may be sampled, which is also referred to as sound samples or data. Such a sample may correspond to a digital value of an electrical signal representing a sound, noise, acoustic, or audio signal, where these terms are used synonymously. In the sound samples sound evoked by different sources may be present, examples are the own vehicle, other vehicles, vulnerable road users (VRUs), pedestrians, emergency vehicles, traffic signals, etc.

FIG. 1 also shows an embodiment of a system 300 comprising embodiments of the apparatus 10, the vehicle 100, respectively. The other vehicle 200 may also be an embodiment comprising another apparatus 10. In embodiments, communication, i.e. transmission, reception or both, may take place among mobile transceivers/vehicles 100, 200 directly and/or between mobile transceivers/vehicles 100, 200 and a network infrastructure component (e.g. a base station, a network server, a backend server, etc.) Such communication may make use of a mobile communication system 300. In other words such communication may be carried out directly, e.g. by means of Device-to-Device (D2D) communication, which may also comprise Vehicle-to-Vehicle (V2V) communication in case of vehicles 100, 200 or Car-to-Car communication. Such communication may be carried out using the specifications of a mobile communication system 300.

The mobile communication system 300 may, for example, correspond to one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11 (802.11p in particular for car-2-car), generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable or configured to communicate with one or more active mobile transceivers/vehicles 100, 200 and a base station transceiver can be located in or adjacent to a coverage area of another base station transceiver, e.g. a macro cell base station transceiver or small cell base station transceiver. Hence, embodiments may provide a mobile communication system 300 comprising two or more mobile transceivers/vehicles 100, 200 and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology. A vehicle 100, 200 may correspond to any conceivable means for transportation, e.g. a car, a bike, a motorbike, a van, a truck, a bus, a ship, a boat, a plane, a train, a tram, etc.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100, 200 can be associated with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100, 200 may communicate directly with each other, i.e. without involving any base station transceiver, which is also referred to as Device-to-Device (D2D) communication. An example of D2D is direct communication between vehicles, also referred to as Vehicle-to-Vehicle communication (V2V). In order to do so radio resources are used, e.g. frequency, time, code, and/or spatial resources, which may as well be used for wireless communication with a base station transceiver. The assignment of the radio resources may be controlled by the base station transceiver, i.e. the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In embodiments the two or more mobile transceivers in vehicles 100, 200 as indicated by FIG. 1a may be registered in the same mobile communication system 300. In other embodiments one or more of the mobile transceivers 100, 200 may be registered in different mobile communication systems 300. The different mobile communication systems 300 may use the same access technology but different operators or they may use different access technologies as outlined above.

Embodiments may enable sound sampling in an enhanced manner. Embodiments may help generating a more precise understanding and (instantaneous) geographical mapping of noise and sound (incl. sources), which can be beneficial. For example, a sound analysis procedure may be provided by embodiments, which is based on distributed measurements done by several cars or vehicles 100, 200. In embodiments, vehicles may carry out noise and sound measurements using audio or acoustic equipment, e.g. attached or mounted to the vehicle. In some embodiments multiple microphones may be attached to a vehicle at different places on the vehicle.

At least in some embodiments built-in microphones of multiple cars are used to measure the noise and sound situation around the vehicle and share (via wireless link) these measured data supplemented by additional data (as position of the vehicle/microphones, microphone characteristics, number of microphones etc.) with other cars. Note that the shared audio data might be either raw or pre-processed. Hence, in some embodiments the control module 14 may be further configured to process the sound samples to determine (processed) information on the sound samples. The control module 14 may be configured to process the sound samples according to one or more elements of the group of low pass filtering, high pass filtering, band pass filtering, spectral analysis, correlation analysis, noise analysis, sound signature detection, noise map creation, and spatial analysis.

For example, the control module may be configured to process the sound samples based on a characteristic of the one or more microphones. In some embodiments some sort of normalization of the sound samples may be carried out to get rid of equipment influences, e.g. the characteristic (e.g. frequency response) of the individual microphones. In embodiments the sound data may be shared. The control module 14 may be configured to communicate the information on the sound samples to a network server via the mobile communication system 300. For example, in a traffic scenario each vehicle receives the sound measurements of several other vehicles, and is able to perform an analysis of the sound by including additional data as e.g. measurement position and microphone characteristics, and extracts information from these measurements. This analysis might be used to search for e.g. specific sound sources and/or sound/noise behavior in space/time/frequency etc. Target sound source might be e.g. VRUs, human beings in general, machines, vehicles. For example, different types of road users have different acoustic signatures or sounds. Sound samples may be used to distinguish a car from a motorbike, a motorized vehicle from a pedestrian (steps having a signature) and so on. Electrically powered vehicles may be distinguished from combustion engine powered vehicles. In some embodiments even characteristic sounds of cyclists may be detected, e.g. based on a pedaling sound signature. For example, a statistical evaluation of a noise map may be enabled. For example, traffic amounts or portions may be determined in embodiments. Such amounts or portions may include relations or percentages of electric vehicle traffic, truck traffic, combustion engine traffic, pedestrian traffic, VRU traffic, developments at a certain location, overall noise level, noise pollution, etc.

Further, the results of the sound analysis might help to identify or locate sounds, which indicate malfunctions or mal-operations. For instance, spectral peaks at certain frequencies may relate to a rotational frequency of a wheel. Other spectral peaks may rather relate to a revolution speed of a combustion engine. Another example may be a frequency component characteristic for a turbocharger due to its high revolution rate etc. Sirens of emergency vehicles have acoustic signatures, which can be determined from the sound samples in some embodiments. Embodiments may offer the opportunity to continuously generate an instantaneous sound analysis.

Figure 2:
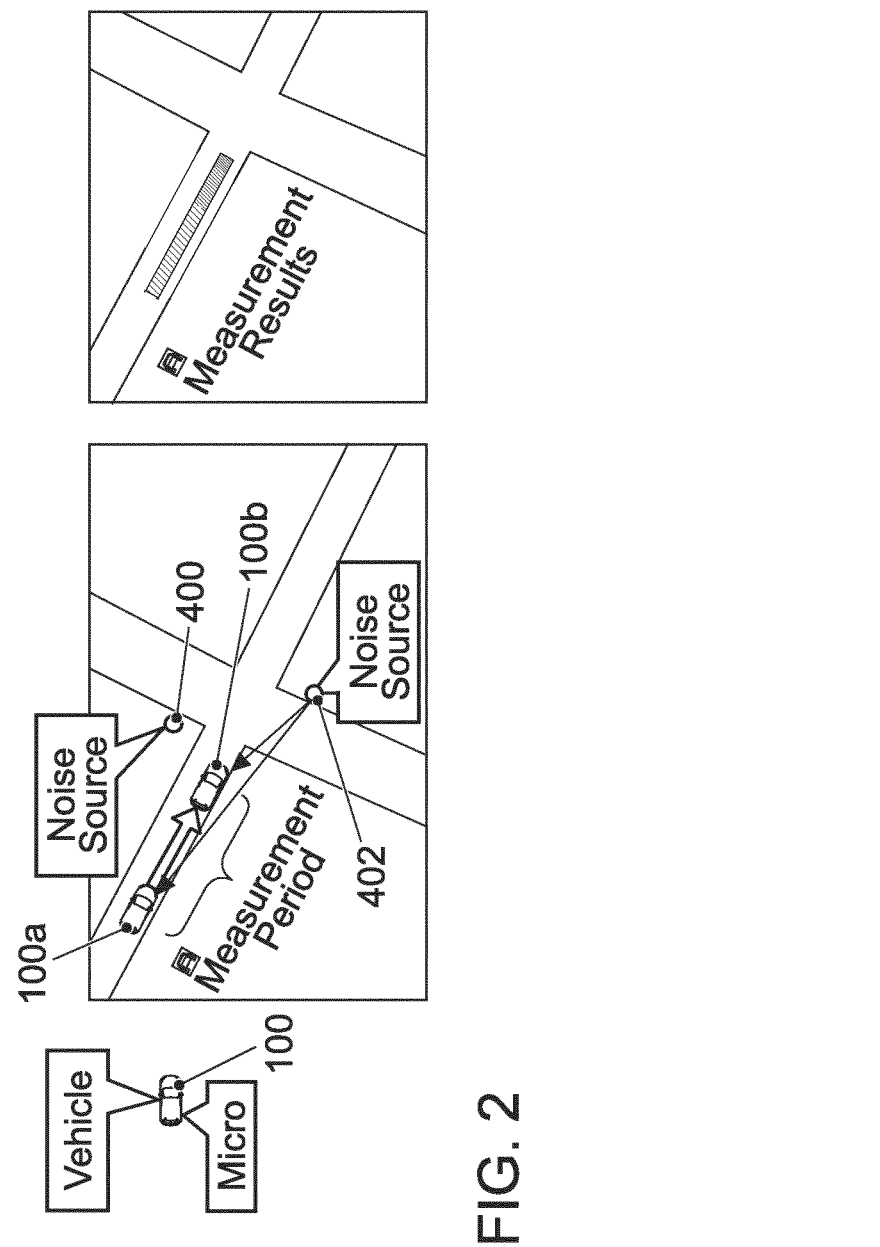
FIG. 2 shows an embodiment of a vehicle recording sound samples.

FIG. 2 shows an embodiment of a vehicle 100 recoding sound samples. On the very left of FIG. 2 the vehicle 100 is shown and in the present embodiment the vehicle 100 comprises a microphone. FIG. 2 shows a map section of a street map in the center. The vehicle 100 moves from position 100a to position 100b and a measurement period is defined or configured along this way. Such configuration may be received together with an according request, e.g. from another vehicle or from the network. In this embodiment the control module 14 of the vehicle 100 is configured to record the sound samples after reception of an according service request. As further illustrated by FIG. 2 there are two sound or noise sources 400 and 402. The vehicle 100 records sound samples of noise from these and other sources during the measurement period. Based on the recorded sound samples a noise map showing the measurement results along the way of the measurement period can be generated. An example of such a noise map is shown on the right of FIG. 2. The noise intensity at position 100a is lower than at position 100b. As indicated on the right, the closer the vehicle 100 comes two the noise sources the higher the noise intensity becomes.

In the present embodiment the control module 14 is configured to generate a noise map of a predefined region, i.e. between locations 100a and 100b. FIG. 2 illustrates the situation for one vehicle 100, which may then provide the measurement results to another vehicle or to a network component. For example, multiple vehicles are equipped with microphones and record sounds/noise around them including their position for a defined time duration (as indicated in FIG. 2) and send the recorded data to others (e.g. other vehicles or cloud/backend server) if there is a request for that kind of service.

Each receiver/apparatus 10 may perform its processing depending on its personal/individual focus. For example, a creation of "noise recordings vs map position" (as indicated in FIG. 2), or more complex analysis like analysis of specific signal frequency versus map position, or a correlation with known sound/noise samples or characteristics may be carried out. In embodiments the control module 14 may be configured to determine information on an erroneous machine behavior based on the sound samples. For example, a known spectral signature for certain defects may be correlated with the measured data. Based on known signatures, e.g. of defects, emergency vehicles, VRUs etc. objects may be identified. The control module 14 may be configured to identify or locate objects based on the sound samples, e.g. by correlation analysis with known signatures. Such correlation analysis could be carried out in the time and/or frequency domain.

FIG. 2 shows a simplified embodiment of a basic measurement and analysis procedure. The embodiment illustrates how a vehicle 100 equipped with microphones (left hand side) performs its audio measurements and processing. In this situation, the vehicle 100 measures the noise of two sources 400, 402 during the measurement period between locations 100a and 100b. After or during the measurement period the vehicle 100 can perform the processing of the measured data including the measurement position. A potential result of the processing is the noise amplitude vs. position representation of the results as indicated on the right of FIG. 2 using a bar diagram. For example, the control module 14 of the apparatus 10 in the vehicle 100 may be configured to reduce a noise level inside the vehicle based on the sound samples.

Other embodiments might use advanced equipment (as e.g. multi-microphone implementations to estimate an angle of arrival (AoA) for specific sounds or frequencies) or additional vehicle data of the transmitter vehicle as e.g. microphone characteristics. In further embodiments the control module 14 may be configured to receive information on other sound samples from another network entity, e.g. another vehicle or a backend server. The control module 14 may be configured to combine locally recorded sound samples with the information on the other sound samples. Hence, audio samples recorded or measured at different vehicles can be made available an enhanced processing can be enabled.

Figure 3:
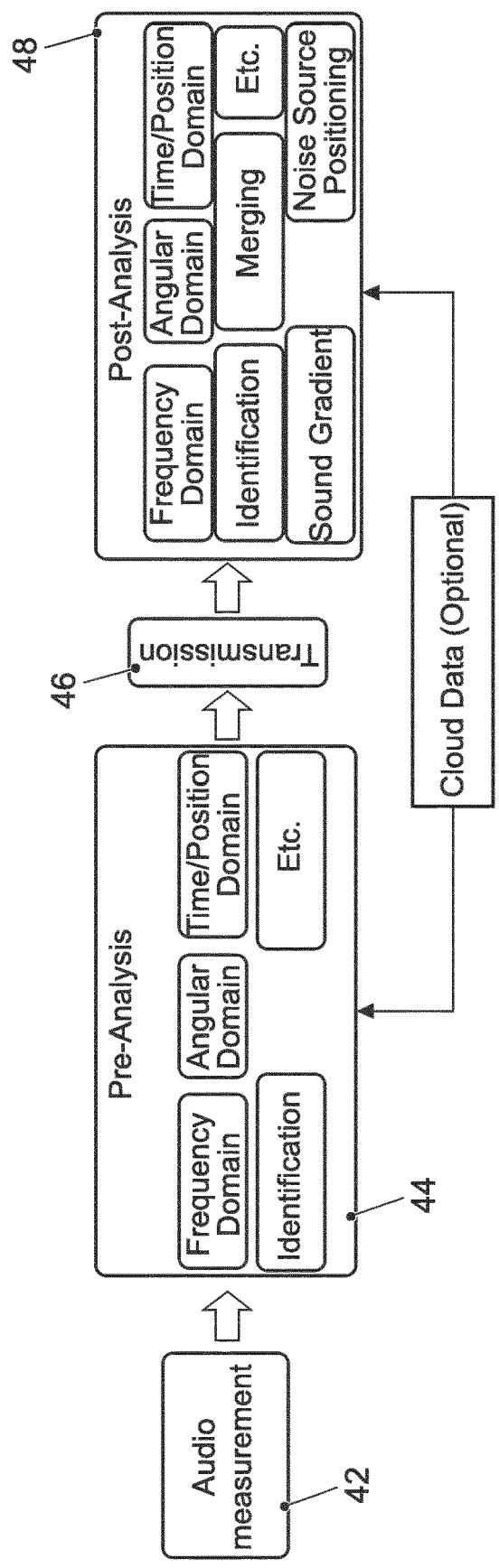
FIG. 3 shows a block diagram of a flow chart of pre-analysis and post analysis of audio data in an embodiment.

FIG. 3 shows a block diagram of a flow chart of pre-analysis and post analysis of audio data in an embodiment. The embodiment of a method starts on the left with an audio measurement 42 at a vehicle. In the apparatus 10 at the vehicle 100 a pre-analysis 44 may be conducted by the control module 14. The pre-analysis 44 may comprise a frequency domain analysis, an angular domain analysis, a time/position domain analysis, an object identification, etc. Cloud data may optionally be used for the pre-analysis 44. Such cloud data can be received from the network cloud, e.g. from a base station, a backend server, or another vehicle. The processed sound samples may be transmitted 46 to a network cloud, a base station, a back end server, or another vehicle for post analysis 48. The post analysis 48 may comprise further frequency domain analysis, further angular domain analysis, further time/position domain analysis, object identification, data merging, sound gradient determination, noise source positioning etc.

FIG. 3 shows a general overview of a process in an embodiment, which consists of a measurement part 42, a pre-analysis part 44 and a post-analysis part 48 and a transmission step 46. Note that alternatively the analysis 44, 48 can be performed at the receiving vehicle only. The data merging process may be either a simple overlaying of the results from the other vehicles or a more advanced process, as e.g. triangulation based on signal strength at each measured position (based on inter-vehicle measurements) or an inter-vehicle angle-of-arrival (AoA) estimation approach. Sound data measured at different positions may be made available from one or more vehicles. Using multiple microphones at one vehicle may enable angular domain analysis, e.g. AoA estimation. Object positioning and object identification as well as malfunction detection may be improved using sound samples measured in a distributed manner (at different positions/locations). The process might also use central data bases to improve the estimation results or depending on the capabilities of the vehicle the vehicle might transfer the processing or a sub-part of the processing to the cloud/edge server.

In addition to the normal usage of the sound/noise measurement data for city noise map creation, other usage types might exist in further embodiments. The user/initiator of this analysis might use the analysis results to achieve, for example, a reduction of interference inside the vehicle or a home. In some embodiments erroneous machine behavior may be verified or an identification of specific (sound/noise) objects may be determined.

Figure 4:
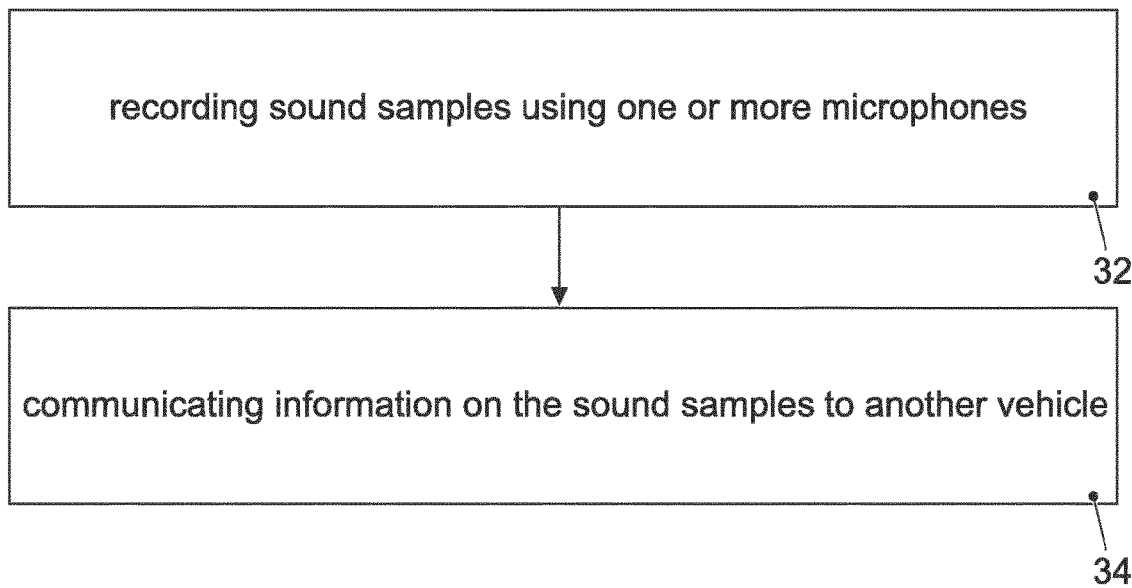
FIG. 4 shows a block diagram of a flow chart of an embodiment of a method for sharing sound data.

FIG. 4 shows a block diagram of a flow chart of an embodiment of a method 30 for sharing sound data of a vehicle 100. The method 30 comprises recording 32 sound samples using one or more microphones 16, and communicating 34 information on the sound samples to another vehicle 200.

As already mentioned, in embodiments the respective methods or processing may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS 10 apparatus for adapting a current route
12 one or more interfaces
14 control module
16 one or more microphones
30 method for sharing sound data
32 recording sound samples using one or more microphones
34 communicating information on the sound samples to another vehicle
42 audio measurement
44 pre-analysis
46 transmission
48 post analysis
100 vehicle
100a start position
100b end position
200 other vehicle
300 system
400 noise source
402 noise source

The invention claimed is:

1. An apparatus for sharing sound samples from a vehicle, the apparatus comprising:
one or more interfaces configured to communicate in a mobile communication system;
one or more microphones configured to convert an acoustic signal into an electric signal;
a control module configured to control the one or more interfaces and the one or more microphones, wherein the control module is further configured to:
record sound samples of a sound and noise situation around the vehicle using the one or more microphones;
generate a noise map of a predefined region; and
communicate information on the sound samples to another vehicle using the one or more interfaces, wherein the information on the sound samples comprises the recorded sound samples.

2. The apparatus of claim 1, wherein the control module is further configured to process the sound samples to determine the information on the sound samples.

3. The apparatus of claim 2, wherein the control module is further configured to process the sound samples according to one or more elements of the group of low pass filtering, high pass filtering, band pass filtering, spectral analysis, correlation analysis, noise analysis, sound signature detection, noise map creation, and spatial analysis.

4. The apparatus of claim 2, wherein the control module is configured to process the sound samples based on a characteristic of the one or more microphones.

5. The apparatus of claim 1, wherein the control module is configured to record the sound samples after reception of an according service request.

6. The apparatus of claim 1, wherein the control module is configured to communicate the information on the sound samples to a network server via the mobile communication system.

7. The apparatus of claim 1, wherein the control module is configured to receive information on other sound samples from another network entity.

8. The apparatus of claim 7, wherein the control module is configured to combine locally recorded sound samples with the information on the other sound samples.

9. The apparatus of claim 1, wherein the control module is configured to determine information on an erroneous machine behavior based on the sound samples.

10. The apparatus of claim 1, wherein the control module is configured to identify or locate objects based on the sound samples.

11. A vehicle comprising the apparatus of claim 1.

12. The vehicle of claim 11, wherein the control module is configured to reduce a noise level inside the vehicle based on the sound samples.

13. The apparatus of claim 1, wherein the information on the sound samples comprises the noise map.

14. The apparatus of claim 1, wherein the noise map is generated for a measurement period.

15. The apparatus of claim 14, wherein the noise map includes information on an amplitude and a position of the sound and noise situation in the predefined region during at least a portion of the measurement period.

16. A method for sharing sound samples of a vehicle, the method comprising:
recording sound samples of a sound and noise situation around the vehicle using one or more microphones;
generating a noise map of a predefined region; and
communicating information on the sound samples to another vehicle, wherein the information on the sound samples comprises the recorded sound samples.

17. A non-transitory, computer-readable medium having a program code for performing the method of claim 16, when the program code is executed on a computer, a processor, or a programmable hardware component.

\* \* \* \* \*